(12) United States Patent
Hu et al.

(10) Patent No.: US 11,897,635 B2
(45) Date of Patent: Feb. 13, 2024

(54) METHOD FOR MAINTAINING WALKER CONSTELLATION FORMATION AND TERMINAL DEVICE

(71) Applicant: Space Engineering University, Beijing (CN)

(72) Inventors: Min Hu, Beijing (CN); Jiuyang Li, Beijing (CN); Xuyu Wang, Beijing (CN); Yongjing Ruan, Beijing (CN); Feifei Li, Beijing (CN); Xianjun Pan, Beijing (CN); Tianyu Sun, Beijing (CN); Ge Zhang, Beijing (CN)

(73) Assignee: Space Engineering University, Beijing (CN)

(*) Notice: Subject to any disclaimer, the term of this patent is extended or adjusted under 35 U.S.C. 154(b) by 271 days.

(21) Appl. No.: 17/458,537

(22) Filed: Aug. 26, 2021

(65) Prior Publication Data
US 2022/0063843 A1    Mar. 3, 2022

(30) Foreign Application Priority Data

Aug. 27, 2020 (CN) .......................... 202010880802.1
Sep. 17, 2020 (CN) .......................... 202010977845.1

(51) Int. Cl.
*B64G 1/24* (2006.01)
*B64G 1/10* (2006.01)
*G05B 17/02* (2006.01)

(52) U.S. Cl.
CPC ........... *B64G 1/242* (2013.01); *B64G 1/1085* (2013.01); *G05B 17/02* (2013.01); *B64G 1/247* (2023.08)

(58) Field of Classification Search
CPC ................. B64G 1/242; B64G 1/1085; B64G 2001/247; B64G 1/10; B64G 1/24; G06F 30/20; G05B 17/02
See application file for complete search history.

(56) References Cited

U.S. PATENT DOCUMENTS

2014/0166814 A1* 6/2014 Dargent ................. B64G 1/242
                                                                  244/158.8
2017/0369192 A1* 12/2017 Kitamura ................. B64G 1/26
(Continued)

FOREIGN PATENT DOCUMENTS

CN          107330277 A  * 11/2017
CN          111591469 A  *  8/2020  ............. B64G 1/242
(Continued)

OTHER PUBLICATIONS

CN-112623277-A translation (Year: 2021).*
(Continued)

*Primary Examiner* — Jason Holloway
*Assistant Examiner* — Kyle T Johnson

(57) ABSTRACT

Provided are a method for maintaining Walker constellation formation and a terminal device. The method comprises: determining a first offset amount of each satellite within a simulation time period according to parameters of a Walker constellation; performing first offset on each satellite according to the first offset amount to obtain a Walker constellation after the first offset; determining a second offset amount of each satellite within the simulation time period according to parameters of the Walker constellation after the first offset; and superimposing the first offset amount and the second offset amount, and performing second offset on each satellite so as to maintain the formation of the Walker constellation.

14 Claims, 5 Drawing Sheets

(56) References Cited

U.S. PATENT DOCUMENTS

2018/0162558 A1* 6/2018 Chao .................. B64G 1/1085
2022/0063843 A1* 3/2022 Hu ...................... B64G 1/1085

FOREIGN PATENT DOCUMENTS

CN 112623277 A * 4/2021 ............ B64G 1/242
CN 114006646 A * 2/2022

OTHER PUBLICATIONS

CN-111591469-A translation (Year: 2020).*
CN-107330277-A translation (Year: 2017).*
CN-114006646-A translation (Year: 2022).*
Integrated constellation design and deployment (Year: 2021).*
Multi-objective optimization design of extended Walker constellation (Year: 2016).*
Optimal Walker Constellation Design on LEO Based (Year: 2020).*

* cited by examiner

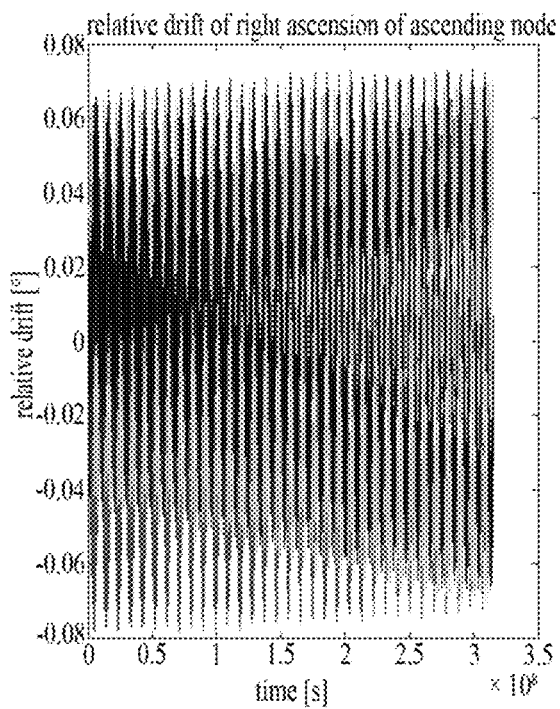
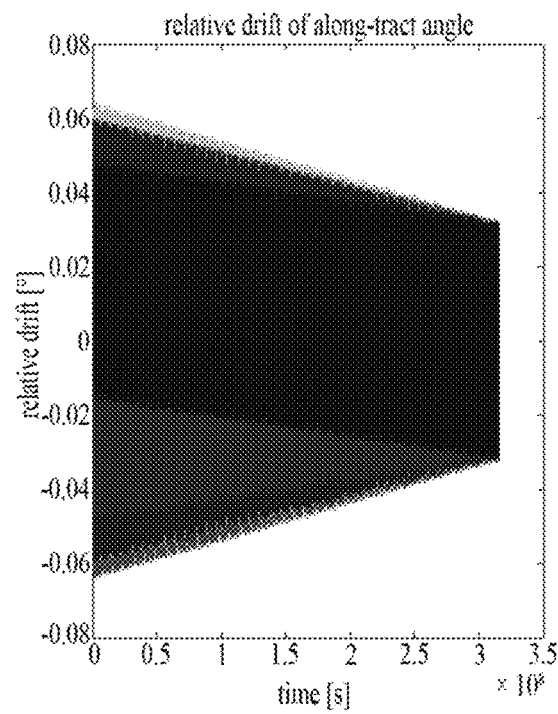
Fig. 6a
Fig. 6b
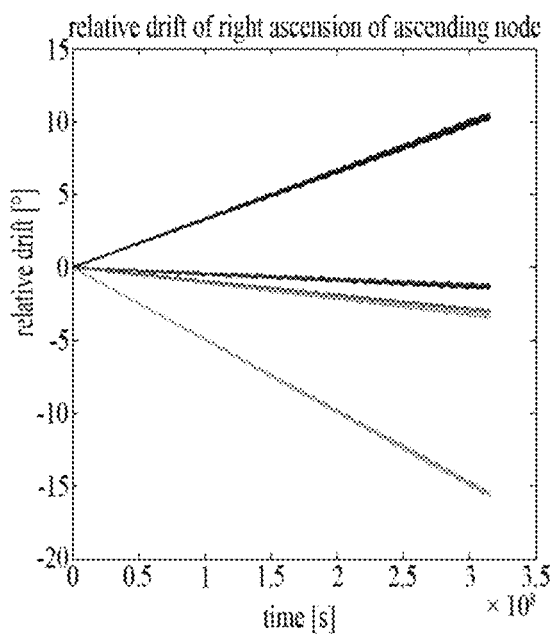
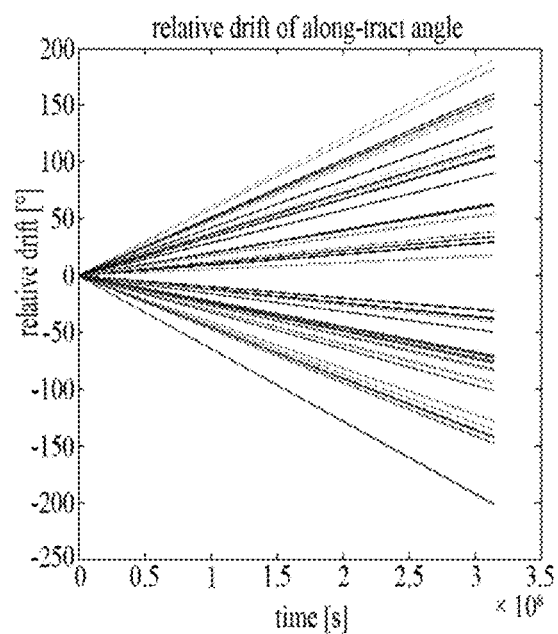
Fig. 7a
Fig. 7b

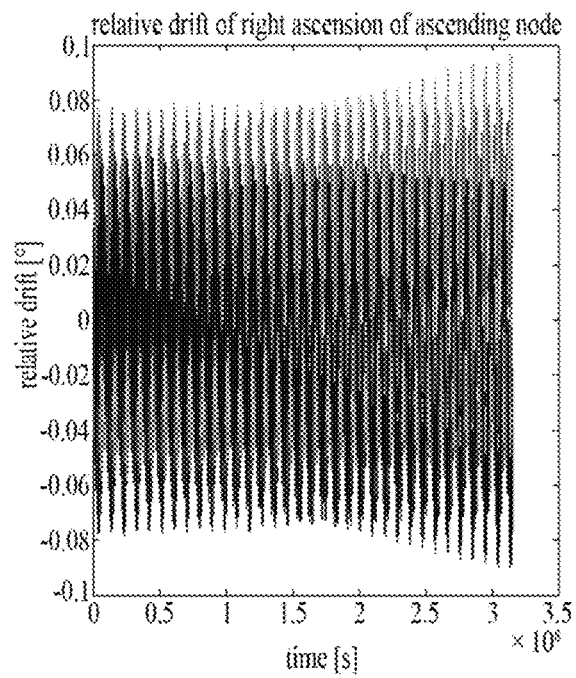 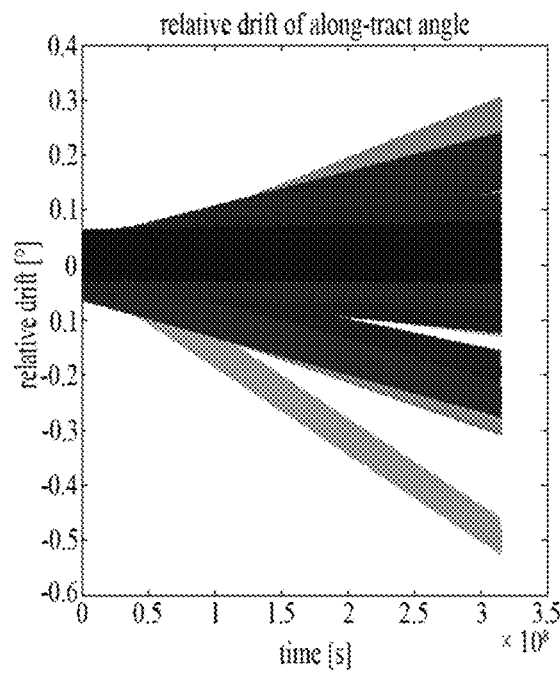
Fig. 8a  Fig. 8b
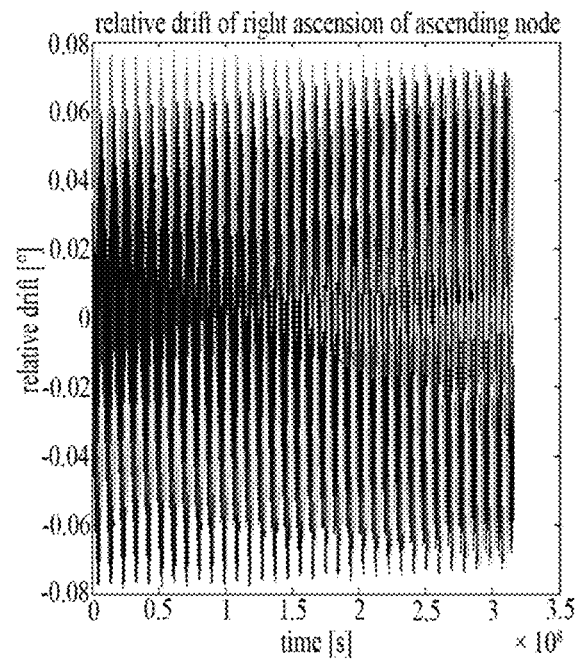 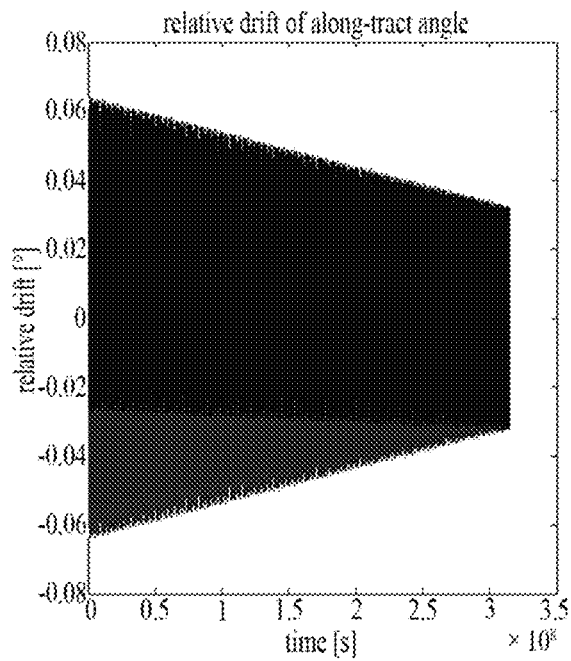
Fig. 9a  Fig. 9b

METHOD FOR MAINTAINING WALKER CONSTELLATION FORMATION AND TERMINAL DEVICE

CROSS-REFERENCE TO RELATED APPLICATIONS

The present application claims the priority of Chinese patent application No. CN202010880802.1, filed on Aug. 27, 2020 and entitled "Method for maintaining Walker constellation formation", and the priority of Chinese patent application No. CN202010977845.1, filed on Sep. 17, 2020 and entitled "Method for maintaining Walker constellation formation and terminal device", which are incorporated herein by reference in their entirety.

FIELD OF THE INVENTION

The present disclosure relates to the technical field of stability analysis of Walker constellation formation, and more specifically to a method for maintaining Walker constellation formation and a terminal device.

BACKGROUND OF THE INVENTION

During operation of a satellite constellation, under the influence of various perturbation forces, a relative position between satellites will gradually drift, such that the satellites gradually deviate from their orbits, and an overall structure of the constellation thus changes. Upon accumulating to a certain extent, this change would lead to geometrical formation of the constellation being destroyed, resulting in great reduction of performance of the constellation.

The Walker constellation is widely used due to its uniform revisit property and great latitude zonal coverage worldwide. Typical Walker navigation constellations comprise a US global positioning system (GPS), an European Galileo navigation system, a Chinese Beidou satellite navigation system, a Russian Glonass navigation system, etc. Typical low-earth-orbit Walker constellations comprise systems such as a US Globalstar® system. With the reduction of satellite launching costs and the development of satellite Internet technology, the number of satellites in low-earth-orbit constellations gradually increases. The number of satellites in low-earth-orbit satellite constellations sharply increases due to the development of minisatellite technology and the reduction of launching costs. OneWeb® plans to launch a constellation composed of 2620 satellites, Samsung® plans to launch a constellation composed of 4600 satellites, Boeing® plans to launch a constellation composed of 2956 satellites, and Starlink® eventually plans to launch a constellation composed of 42,000 satellites. These constellations are large in scale, and a distribution density of satellites in each of the constellations is extremely high. In order to achieve global coverage and long-term stable operation of constellations, a very high requirement is put forward for accuracy of constellation formation maintenance.

In the current domestic and international researches on satellite constellation formation maintenance, Yu Chen, et al. proposed that based on measured on-orbit data, relative drift of phase angle can be controlled by maneuvering satellites with a small cumulative relative drift of phase difference, so that the relative drift of phase angle accumulated in one year can be maintained within a threshold of ±5°. However, by utilizing this method, the number of satellites in constellations is relatively small and the threshold is relatively large, which cannot meet the requirements of maintaining a formation of a Walker constellation with a large number of satellites. In addition, Shah, et al. used a Lyapunov control method to calculate speed increments required by absolute control and relative control on a constellation. Ulybyshev, et al. used a linear quadratic controller to achieve relative position maintenance between satellites in a constellation through thrust. Casanova, et al. studied an initial parameter setting method for ensuring constellation formation maintaining stability of a two-dimensional lattice flower-shaped constellation under the influence of J2 perturbation, but the study is not applicable to a Walker constellation.

SUMMARY OF THE INVENTION

Thus, there is a need for a method for maintaining Walker constellation formation and a terminal device, which can be easily operated with high accuracy of constellation formation maintenance. Furthermore, since offset merely occurs when an orbit is initially entered, there is no need for subsequent fuel consumption, thereby saving on fuel of a satellite and prolonging a service life of the satellite. In the technical solution provided by the present disclosure, after a relative drift amount of a constellation not having been subjected to offset is obtained by simulation, an offset amount of first offset is obtained by fitting, a second offset amount is then obtained by fitting according to a relative drift amount of the constellation after the first offset, and the two offset amounts are superimposed, thereby effectively controlling the relative drift amount of the constellation. Therefore, the method and the corresponding terminal device provided by the present disclosure are particularly suitable for formation maintenance control on a low-earth-orbit Walker constellation.

The present disclosure provides a method for maintaining Walker constellation formation, comprising: determining a first offset amount of each satellite within a simulation time period according to parameters of a Walker constellation; performing first offset on each satellite according to the first offset amount to obtain a Walker constellation after the first offset; determining a second offset amount of each satellite within the simulation time period according to parameters of the Walker constellation after the first offset; and superimposing the first offset amount and the second offset amount, and performing second offset on each satellite according to a superimposing result so as to maintain the formation of the Walker constellation.

The present disclosure also provides a terminal device, comprising a memory, a processor and a computer program which is stored on the memory and can be run on the processor. The computer program, when executed by the processor, implements the steps of the above-mentioned method.

BRIEF DESCRIPTION OF THE DRAWINGS

FIG. 6a is a result diagram of relative drift of a right ascension of ascending node varying over time when the small-scale constellation has been subjected to two times of offset superimposed;

FIG. 6b is a result diagram of relative drift of an along-track angle varying over time when the small-scale constellation has been subjected to two times of offset superimposed;

FIG. 7a is a result diagram of relative drift of a right ascension of ascending node varying over time when the large-scale constellation has not been subjected to offset;

FIG. 7b is a result diagram of relative drift of an along-track angle varying over time when the large-scale constellation has not been subjected to offset;

FIG. 8a is a result diagram of relative drift of a right ascension of ascending node varying over time after the large-scale constellation has been subjected to first offset;

FIG. 8b is a result diagram of relative drift of an along-track angle varying over time after the large-scale constellation has been subjected to first offset;

FIG. 9a is a result diagram of relative drift of a right ascension of ascending node varying over time when the large-scale constellation has been subjected to two times of offset superimposed; and FIG. 9b is a result diagram of relative drift of an along-track angle varying over time when the large-scale constellation has been subjected to two times of offset superimposed.

DETAILED DESCRIPTION OF THE EMBODIMENTS

In order to make the objectives, the technical solutions and the beneficial effects of the present disclosure clearer, the present disclosure is further illustrated in detail below in conjunction with the accompanying drawings and embodiments. It should be noted that the particular embodiments described herein are merely illustrative of the present disclosure and are not intended to limit the present disclosure.

Figure 1:
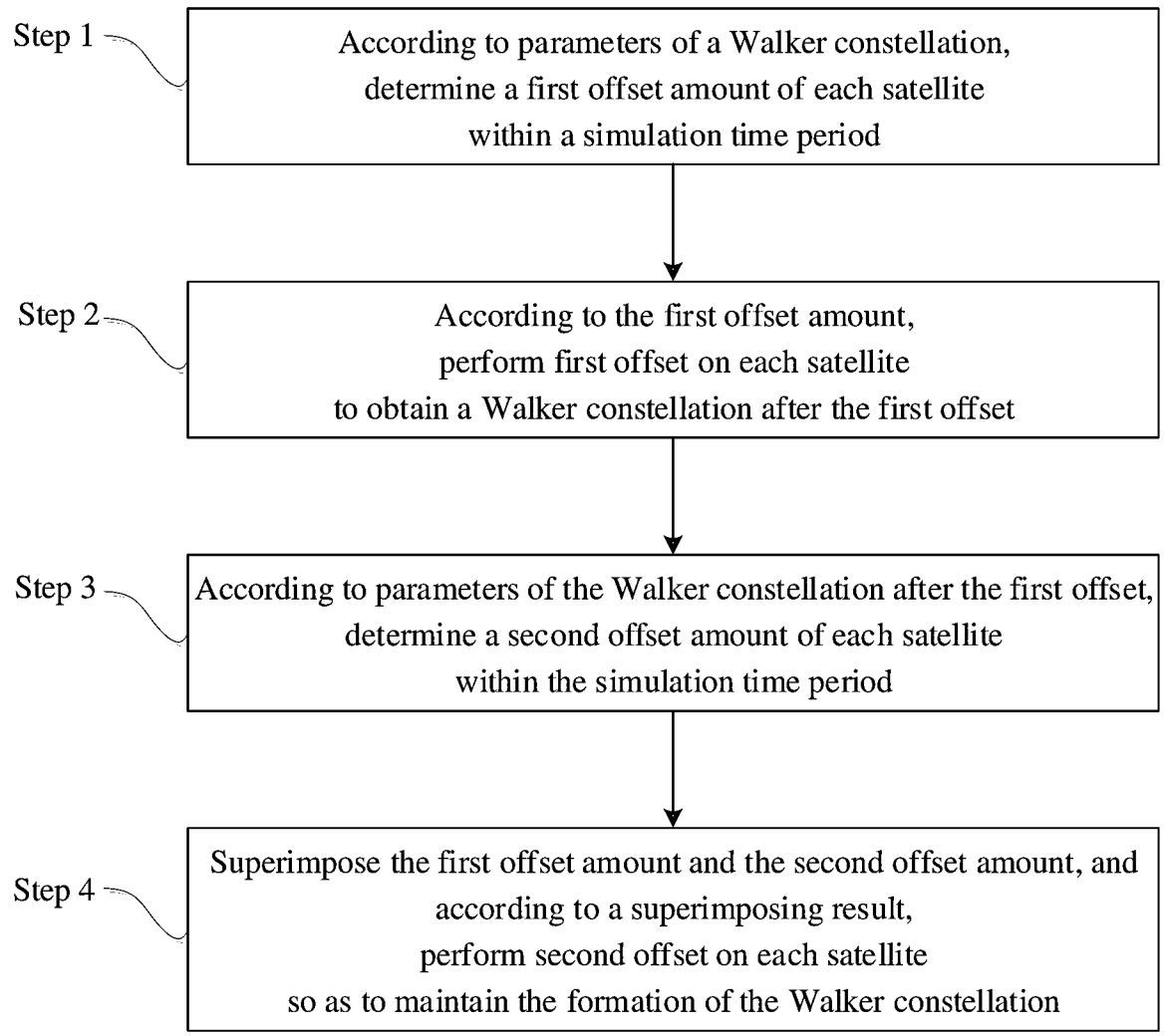
FIG. 1 is a flowchart of a method for maintaining Walker constellation formation.

FIG. 1 is a flowchart of a method for maintaining Walker constellation formation of the present disclosure.

Firstly, a relative drift amount of a constellation is obtained by high-accuracy orbit integration. Secondly, second-order fitting is performed on the relative drift amount by time to obtain a variation rate of the relative drift amount, and an offset amount of first offset is then obtained. On the basis of the first offset, an offset amount of second offset is then obtained by performing fitting on a relative drift amount of the constellation after the first offset. The two offset amounts are superimposed to obtain an initial offset amount of each satellite in the constellation.

The method for maintaining Walker constellation formation of the present disclosure comprises the following steps.

At step S1, a first offset amount of each satellite within a simulation time period is determined according to parameters of a Walker constellation.

Furthermore, step S1 especially comprises several following sub-steps.

Preferably, at Step S1.1, a first relative drift amount of each satellite at each simulation moment is determined according to the parameters of the Walker constellation.

For example, variation laws of respective relative drift amounts $\Delta\Omega_i$, $\Delta\lambda_i$ of a right ascension of ascending node and an along-track angle of each satellite in the constellation varying over time are obtained by high-accuracy orbit integration, according to a nominal semi-major axis $\alpha$, an eccentricity e, an orbit inclination i, the total number N of satellites, the number P of orbit planes and a phase factor F of the constellation that are taken as initial input parameters.

The first relative drift amount of each satellite at each simulation moment is determined according to a first formula, which may be written as:

$$\begin{cases} \Delta\Omega_i = (\Omega_i - \Omega_i^*) - \dfrac{\sum_{i=1}^{N}(\Omega_i - \Omega_i^*)}{N} \\ \Delta\lambda_i = (\lambda_i - \lambda_i^*) - \dfrac{\sum_{i=1}^{N/P}(\lambda_i - \lambda_i^*)}{(N/P)} \end{cases}$$

where $\Delta\Omega_i$ is a relative drift amount of a right ascension of ascending node of an ith satellite, $\Delta\lambda_i$ is a relative drift amount of an along-track angle of the ith satellite, $\Omega_i$ is a right ascension of ascending node of the ith satellite under a perturbative force, $\lambda_i$ is an along-track angle of the ith satellite under a perturbative force, $\lambda_i$ is a right ascension of ascending node of a nominal orbit of the ith satellite, $\Omega_i^*$ is an along-track angle of the nominal orbit of the ith satellite, N is the total number of satellites, and P is the number of orbit planes.

Preferably, at step S1.2, the first offset amount of each satellite within the simulation time period is determined according to the first relative drift amount.

Optionally, at step S1.2.1, the relational expression of the first relative drift amount varying over time within the simulation time period is determined, the relational expression being a second formula, which is written as:

$$\begin{cases} \Delta\Omega(t) = \Delta\Omega_0 + k'_\Omega t + k_1^\Omega t + 0.5 k_2^\Omega t^2 \\ \Delta\lambda(t) = \Delta\lambda_0 + k'_\lambda t + k_1^\lambda t + 0.5 k_2^\lambda t^2 \end{cases}$$

where $\Delta\Omega(t)$ represents a right ascension of ascending node as a function of time, $\Delta\lambda(t)$ represents an along-track angle as a function of time, $\Delta\Omega_0$ is an initial value of relative drift of the right ascension of ascending node, $\Delta\lambda_0$ is an initial value of relative drift of the along-track angle, $k_\Omega'$ is a first-order variation rate generated by an initial offset amount of the right ascension of ascending node, $k_\lambda'$ is a first-order variation rate generated by an initial offset amount of the along-track angle, $k_\lambda'$ is a first-order variation rate of the relative drift of the right ascension of ascending node, $k_1\lambda$ is a first-order variation rate of the relative drift of the along-track angle, $k_2^\Omega$ is a variation acceleration of the relative drift of the right ascension of ascending node, and $k_2^\lambda$ is a variation acceleration of the relative drift of the along-track angle.

In order to suppress relative drift of a satellite in a constellation within a certain period of time, it is required that the above-mentioned relational expression satisfies a third formula, which is written as:

$$\begin{cases} \Delta\Omega(t_0 = 0) = \Delta\Omega(t_{end}) \\ \Delta\lambda(t_0 = 0) = \Delta\lambda(t_{end}) \end{cases}$$

where $t_0$ is a simulation start time, and $t_{end}$ is a simulation end time.

Optionally, at step S1.2.2, quadratic polynomial fitting is performed on the relational expression to obtain a first-order variation rate and a variation acceleration of relative drift of each satellite within the simulation time period.

Specifically, quadratic polynomial fitting is performed on the relational expression to obtain a first-order variation rate $k_1^\Omega$ of the relative drift of the right ascension of ascending node, a variation acceleration $k_2^\Omega$ of the relative drift of the right ascension of ascending node, a first-order variation rate $k_1^\Omega$ of the relative drift of the along-track angle and a variation acceleration $k_2^\lambda$ of the relative drift of the along-track angle.

A first-order variation rate $k_\Omega'$ generated by the initial offset amount of the right ascension of ascending node and a first-order variation rate $k_\lambda'$ generated by the initial offset amount of the along-track angle are determined according to a fourth formula, which is written as:

$$\begin{cases} k_\Omega' = -\dfrac{k_1^\Omega t_{end} + 0.5 k_2^\Omega t_{end}^2}{t_{end}} \\ k_\lambda' = -\dfrac{k_1^\lambda t_{end} + 0.5 k_2^\lambda t_{end}^2}{t_{end}} \end{cases}.$$

Optionally, at step S1.2.3, the first offset amount of each satellite is determined according to the first-order variation rate and the variation acceleration. The first offset amount comprises of an offset amount of a nominal semi-major axis, an offset amount of an eccentricity and an offset amount of an orbit inclination.

Specifically, the first offset amount of each satellite is determined according to a fifth formula, which is written as:

$$\begin{cases} k_1^\Omega = \dfrac{\partial \Omega}{\partial a}\Delta a_0 + \dfrac{\partial \Omega}{\partial e}\Delta e_0 + \dfrac{\partial \Omega}{\partial i}\Delta i_0 \\ k_1^\lambda = \dfrac{\partial \lambda}{\partial a}\Delta a_0 + \dfrac{\partial \lambda}{\partial e}\Delta e_0 + \dfrac{\partial \lambda}{\partial i}\Delta i_0 \\ k_2^\Omega = \dfrac{\partial \Omega}{\partial a}\Delta \dot{a} + \dfrac{\partial \Omega}{\partial e}\Delta \dot{e} + \dfrac{\partial \Omega}{\partial i}\Delta \dot{i} \\ k_2^\lambda = \dfrac{\partial \lambda}{\partial a}\Delta \dot{a} + \dfrac{\partial \lambda}{\partial e}\Delta \dot{e} + \dfrac{\partial \lambda}{\partial i}\Delta \dot{i} \end{cases}$$

where $\Delta a_0$ is an offset amount of the nominal semi-major axis, $\Delta e_0$ is an offset amount of an eccentricity, $\Delta i_0$ is an offset amount of an orbit inclination, $$\dfrac{\partial \Omega}{\partial a}, \dfrac{\partial \Omega}{\partial e}, \dfrac{\partial \Omega}{\partial i}$$

are partial derivatives of a variation rate of a right ascension of ascending node influenced by a perturbative force with respect to the semi-major axis, the eccentricity and the orbit inclination, respectively, $$\dfrac{\partial \lambda}{\partial a}, \dfrac{\partial \lambda}{\partial e}, \dfrac{\partial \lambda}{\partial i}$$

are partial derivatives of a variation rate of an along-track angle influenced by the perturbative force with respect to the semi-major axis, the eccentricity and the orbit inclination, respectively, and $\Delta \dot{a}$, $\Delta \dot{e}$, $\Delta \dot{i}$ are respective variation rates, which are determined by the perturbative forces applied to the respective satellite. The variation rate of the right ascension of ascending node influenced by the perturbative force is obtained according to an influence formula of the corresponding perturbative force, which will not be described here again.

According to the method of the present disclosure, at step S2, first offset is performed on each satellite according to the first offset amount to obtain a Walker constellation after the first offset.

There may be a certain residual item and higher-order item not being eliminated from each of the first-order variation rate and the variation acceleration of the relative drift after the first offset. Therefore, in order to further improve the accuracy of constellation formation maintenance, after step S2, the present disclosure further comprises the following steps.

According to the method of the present disclosure, at step S3, a second offset amount of each satellite within the simulation time period is determined according to parameters of the Walker constellation after the first offset.

Furthermore, step S3 especially includes several following sub-steps.

Preferably, at step S3.1, a second relative drift amount of each satellite at each simulation moment is determined according to parameters of the Walker constellation after the first offset. The second relative offset amount is also obtained by high-accuracy orbit integration.

Preferably, at step S3.2, the second offset amount of each satellite within the simulation time period is determined according to the respective second relative drift amount.

Optionally, at step S3.2.1, a relational expression of the second relative drift amount varying over time within the simulation time period is determined. The relational expression is a sixth formula, which is written as:

$$\begin{cases} \Delta\Omega(t) = \Delta\Omega_0 + \tilde{k}_1^\Omega t + 0.5\tilde{k}_2^\Omega t^2 + O(t^2) \\ \Delta\lambda(t) = \Delta\lambda_0 + \tilde{k}_1^\lambda t + 0.5\tilde{k}_2^\lambda t^2 + O(t^2) \end{cases}$$

where $\Delta\Omega(t)$ represents a right ascension of ascending node as a function of time, $\Delta\lambda(t)$ represents an along-track angle as a function of time, $\Delta\Omega_0$ is an initial value of relative drift of the right ascension of ascending node, $\Delta\lambda_0$ is an initial value of relative drift of the along-track angle, $\tilde{k}_1^\Omega$ and $\tilde{k}_2^\Omega$ are a residual term of a first-order variation rate and a residual term of a variation acceleration of the relative drift of the right ascension of ascending node after the first offset, respectively, $\tilde{k}_1^\lambda$ and $\tilde{k}_2^\lambda$ are a residual term of a first-order variation rate and a residual term of a variation acceleration of the relative drift of the along-track angle after the first offset, respectively, and $O(t^2)$ is a higher-order term after the first offset.

Optionally, at step S3.2.2, quadratic polynomial fitting is performed on the relational expression to obtain a first-order variation rate and a variation acceleration of relative drift of each satellite within the simulation time period.

Optionally, at step S3.2.3, the second offset amount of each satellite is determined according to the first-order variation rate and the variation acceleration.

It should be noted that the approach for obtaining the second offset amount in step S3 is similar to the approach for obtaining the first offset amount in step S1, and thus will not be described here again.

According to the method of the present disclosure, at step S4, the first offset amount and the second offset amount are superimposed, and second offset is performed on each satellite according to a superimposing result so as to maintain the formation of the Walker constellation.

By the present disclosure, a residual item and a higher-order item that are present in each of a first-order variation rate and a variation acceleration of relative drift after first offset are effectively removed by way of superimposing two times of offset, thereby improving the accuracy of constellation formation maintenance.

The method of the present disclosure is applicable to formation maintenance of a Walker constellation, particularly to formation maintenance of a low-earth-orbit Walker constellation.

The above-mentioned embodiments define respective parameters of low-earth-orbit Walker constellations in two scales, parameters of a satellite and a perturbative force applied thereto. A relative drift amount of a constellation not having been subjected to offset is obtained by high-accuracy orbit integration, and an offset amount of first offset is obtained according to the relative drift amount. An offset amount of second offset is obtained according to a simulation result after the first offset. The offset amounts of the two times of offset are superimposed to simulate a final drift amount of the constellation, so as to adjust a position of the satellite in a targeted manner, thereby maintaining the formation of the constellation.

In the present embodiment, simulation analysis is performed on low-earth-orbit Walker constellation in two different scales by using an HPOP high-accuracy orbit predictor, where respective perturbative forces applied to the two types of constellations are both J2 perturbation of non-spheric figure of the Earth and atmospheric drag perturbation, an atmospheric density model is Jacchia 70, an atmospheric drag coefficient is 2.2, an area-mass ratio of a satellite is 0.003, and a simulation duration is about 10 years.

Figure 2:
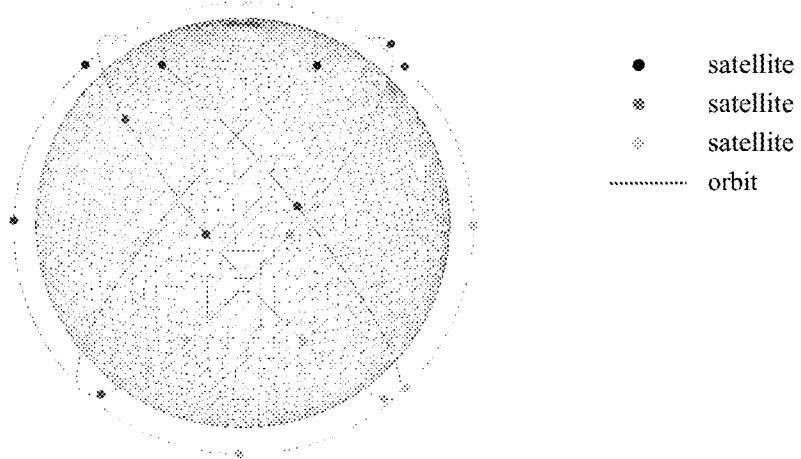
FIG. 2 is a schematic diagram of a small-scale constellation.
Figure 3:
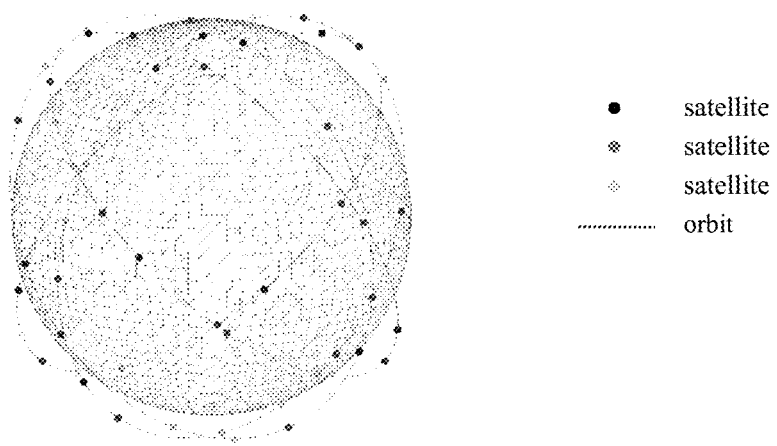
FIG. 3 is a schematic diagram of a large-scale constellation.
Figure 4A:
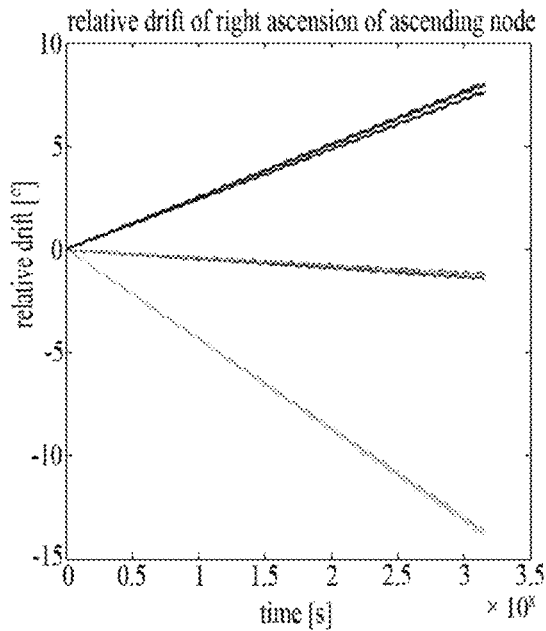
FIG. 4a is a result diagram of relative drift of a right ascension of ascending node varying over time when the small-scale constellation has not been subjected to offset.
Figure 4B:
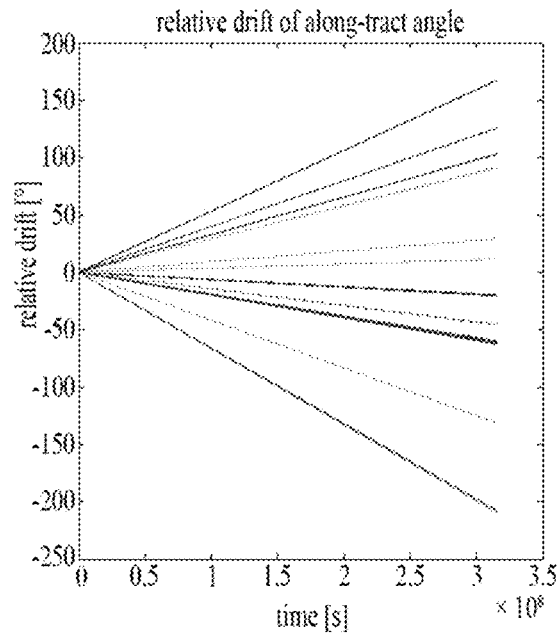
FIG. 4b is a result diagram of relative drift of an along-track angle varying over time when the small-scale constellation has not been subjected to offset.
Figure 5A:
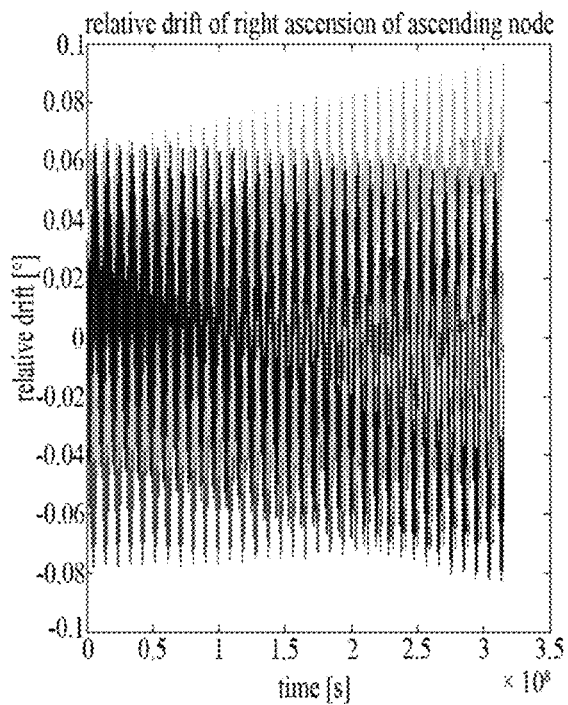
FIG. 5a is a result diagram of relative drift of a right ascension of ascending node varying over time after the small-scale constellation has been subjected to first offset.
Figure 5B:
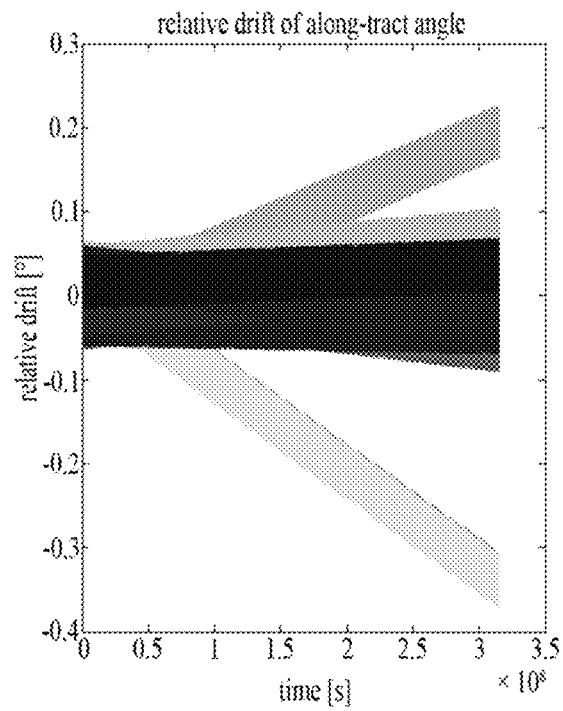
FIG. 5b is a result diagram of relative drift of an along-track angle varying over time after the small-scale constellation has been subjected to first offset.

The formation of a small-scale constellation and a large-scale constellation in the above-mentioned embodiments is 24/3/1 and 80/4/1, respectively, where an orbit height is 800 km, an eccentricity is 0.001, and an orbit inclination is 60 degrees. The small-scale constellation is shown in FIG. 2, and the large-scale constellation is shown in FIG. 3. The variation of relative drift over time of the small-scale constellation not having been subjected to offset is shown in FIGS. 4a and 4b, respectively. The variation of relative drift over time of the large-scale constellation not having been subjected to offset is shown in FIGS. 7a and 7b, respectively. The variation of the relative drift over time of the small-scale constellation after the first offset is shown in FIGS. 5a and 5b, respectively. The variation of the relative drift over time of the large-scale constellation after the first offset is shown in FIGS. 8a and 8b, respectively, in which a relative drift amount greatly decreases but still has a divergence trend. The variation of the relative drift of the small-scale constellation after two times of offset is shown in FIGS. 6a and 6b, respectively. The variation of the relative drift of the large-scale constellation after two times of offset is shown in FIGS. 9a and 9b, respectively, in which a relative drift amount of the constellation decreases below 0.1 degree, and has a convergence trend. Therefore, the method of the present disclosure will achieve relatively high formation maintenance accuracy for constellations.

As stated above, in the method for maintaining Walker constellation formation of the present disclosure, firstly, an offset amount of first offset is obtained by fitting according to a relative drift amount of a constellation not having been subjected to offset, and a second offset amount is then obtained by fitting according to a relative drift amount after the first offset to eliminate influence of a residual item, such that the relative drift is greatly reduced. The method has the advantages of simple operations and high accuracy of constellation formation maintenance. Moreover, since offset merely occurs when an orbit is initially entered, there is no need for subsequent fuel consumption, thereby saving on fuel of a satellite and prolonging a service life of the satellite.

The present disclosure further provides a terminal device, including a memory, a processor and a computer program which is stored on the memory and can be run on the processor. The computer program, when executed by the processor, implements the steps of the above-mentioned method.

The above are only a few embodiments of the application, and does not limit the application in any form; although the application is disclosed as above with preferred embodiments, same are to limit the application; any person skilled in the art can make some changes or modifications using the technical content disclosed above, without departing from the scope of the technical solution, which is equivalent to an equivalent embodiment and belongs to the scope of the technical solution.

The invention claimed is:

1. A method for maintaining Walker constellation formation, comprising:
   determining, according to parameters of a Walker constellation, a first offset amount of each satellite within a simulation time period;
   performing, according to the first offset amount, first offset on each satellite to obtain a Walker constellation after the first offset;
   determining, according to parameters of the Walker constellation after the first offset, a second offset amount of each satellite within the simulation time period; and
   superimposing the first offset amount and the second offset amount, and performing second offset on each satellite according to a superimposing result so as to maintain the formation of the Walker constellation.

2. The method for maintaining Walker constellation formation according to claim 1, wherein the step of determining the first offset amount of each satellite within the simulation time period according to the Walker constellation parameters further comprises:
   determining a first relative drift amount of each satellite at each simulation moment according to the Walker constellation parameter; and
   determining the first offset amount of each satellite within the simulation time period according to the first relative drift amount.

3. The method for maintaining Walker constellation formation according to claim 2, wherein the parameters of the Walker constellation comprise a nominal semi-major axis α, an eccentricity e, an orbit inclination i, the total number N of satellites, the number P of orbital planes and a phase factor F of the Walker constellation.

4. The method for maintaining Walker constellation formation according to claim 2, wherein the step of determining the first drift amount of each satellite at each simulation moment according to the parameters of the Walker constellation further comprises:
   determining the first relative drift amount of each satellite at each simulation moment according to a first formula, which is written as:

$$\begin{cases} \Delta\Omega_i = (\Omega_i - \Omega_i^*) - \dfrac{\sum_{i=1}^{N}(\Omega_i - \Omega_i^*)}{N} \\ \Delta\lambda_i = (\lambda_i - \lambda_i^*) - \dfrac{\sum_{i=1}^{N/P}(\lambda_i - \lambda_i^*)}{(N/P)} \end{cases},$$

where $\Delta\Omega_i$ is a relative drift amount of a right ascension of ascending node of an ith satellite, $\Delta\lambda_j$ is a relative drift amount of an along-track angle of the ith satellite, $\Omega_i$ is a right ascension of ascending node of the ith satellite under a perturbative force, $\lambda_i$ is an along-track angle of the ith satellite under a perturbative force, $\Omega_i^*$ is a right ascension of ascending node of a nominal orbit of the ith satellite, $\lambda_i^*$ is an along-track angle of the nominal orbit of the ith satellite, N is the total number of satellites, and P is the number of orbit planes.

5. The method for maintaining Walker constellation formation according to claim 4, wherein the step of determining the first offset amount of each satellite within the simulation time period according to the first relative drift amount further comprises:

determining a relational expression of the first relative drift amount varying over time within the simulation time period;

performing quadratic polynomial fitting on the relational expression to obtain a first-order variation rate and a variation acceleration of relative drift of each satellite within the simulation time period; and determining the first offset amount of each satellite according to the first-order variation rate and the variation acceleration.

6. The method for maintaining Walker constellation formation according to claim 5, wherein the first offset amount comprises an offset amount of a nominal semi-major axis, an offset amount of an eccentricity and an offset amount of an orbit inclination.

7. The method for maintaining Walker constellation formation according to claim 5, wherein the step of determining the relational expression of the first relative drift amount varying over time within the simulation time period further comprises:

the relational expression of the first relative drift amount varying over time within the simulation time period is a second formula, which is written as:

$$\begin{cases} \Delta\Omega(t) = \Delta\Omega_0 + k'_\Omega t + k_1^\Omega t + 0.5 k_2^\Omega t^2 \\ \Delta\lambda(t) = \Delta\lambda_0 + k'_\lambda t + k_1^\lambda t + 0.5 k_2^\lambda t^2 \end{cases},$$

where $\Delta\Omega(t)$ represents a right ascension of ascending node as a function of time, $\Delta\lambda(t)$ represents an along-track angle as a function of time, $\Delta\Omega_0$ is an initial value of relative drift of the right ascension of ascending node, $\Delta\lambda_0$ is an initial value of relative drift of the along-track angle, $k_\Omega'$ is a first-order variation rate generated by an initial offset amount of the right ascension of ascending node, $k_\lambda'$ is a first-order variation rate generated by an initial offset amount of the along-track angle, $k_1^\Omega$ is a first-order variation rate of the relative drift of the right ascension of ascending node, $k_1^\lambda$ is a first-order variation rate of the relative drift of the along-track angle, $k_2^\Omega$ is a variation acceleration of the relative drift of the right ascension of ascending node, and $k_2^\lambda$ is a variation acceleration of the relative drift of the along-track angle.

8. The method for maintaining Walker constellation formation according to claim 7, wherein the relational expression satisfies a third formula, which is written as:

$$\begin{cases} \Delta\Omega(t_0 = 0) = \Delta\Omega(t_{end}) \\ \Delta\lambda(t_0 = 0) = \Delta\lambda(t_{end}) \end{cases},$$

where $t_0$ is a simulation start time, and $t_{end}$ is a simulation end time.

9. The method for maintaining Walker constellation formation according to claim 8, wherein the step of performing quadratic polynomial fitting on the relational expression to obtain the first-order variation rate and the variation acceleration of relative drift of each satellite within the simulation time period further comprises:

performing quadratic polynomial fitting on the relational expression to obtain a first-order variation rate $k_1^\Omega$ of the relative drift of the right ascension of ascending node, a variation acceleration $k_2^\Omega$ of the relative drift of the right ascension of ascending node, a first-order variation rate $k_1^\lambda$ of the relative drift of the along-track angle and a variation acceleration $k_2^\lambda$ of the relative drift of the along-track angle; and determining, according to a fourth formula, a first-order variation rate $k_\Omega'$ generated by the initial offset amount of the right ascension of ascending node and a first-order variation rate $k_\lambda'$ generated by the initial offset amount of the along-track angle, wherein the fourth formula is written as:

$$\begin{cases} k'_\Omega = -\dfrac{k_1^\Omega t_{end} + 0.5 k_2^\Omega t_{end}^2}{t_{end}} \\ k'_\lambda = \dfrac{k_1^\lambda t_{end} + 0.5 k_2^\lambda t_{end}^2}{t_{end}} \end{cases}.$$

10. The method for maintaining Walker constellation formation according to claim 5, wherein the step of determining the first offset amount of each satellite according to the first-order variation rate and the variation acceleration further comprises:

determining the first offset amount of each satellite according to a fifth formula, which is written as:

$$\begin{cases} k_1^\Omega = \dfrac{\partial\dot\Omega}{\partial a}\Delta a_0 + \dfrac{\partial\dot\Omega}{\partial e}\Delta e_0 + \dfrac{\partial\dot\Omega}{\partial i}\Delta i_0 \\ k_1^\lambda = \dfrac{\partial\dot\lambda}{\partial a}\Delta a_0 + \dfrac{\partial\dot\lambda}{\partial e}\Delta e_0 + \dfrac{\partial\dot\lambda}{\partial i}\Delta i_0 \\ k_2^\Omega = \dfrac{\partial\dot\Omega}{\partial a}\Delta\dot a + \dfrac{\partial\dot\Omega}{\partial e}\Delta\dot e + \dfrac{\partial\dot\Omega}{\partial i}\Delta\dot i \\ k_2^\lambda = \dfrac{\partial\dot\lambda}{\partial a}\Delta\dot a + \dfrac{\partial\dot\lambda}{\partial e}\Delta\dot e + \dfrac{\partial\dot\lambda}{\partial i}\Delta\dot i \end{cases},$$

where $\Delta\alpha_0$ is an offset amount of the nominal semi-major axis, $\Delta e_0$ is an offset amount of an eccentricity, $\Delta i_0$ is an offset amount of an orbit inclination, $$\dfrac{\partial\dot\Omega}{\partial a},\ \dfrac{\partial\dot\Omega}{\partial e},\ \dfrac{\partial\dot\Omega}{\partial i}$$

are partial derivatives of a variation rate of a right ascension of ascending node influenced by a perturbative force with respect to the semi-major axis, the eccentricity and the orbit inclination, respectively, $$\frac{\partial \lambda}{\partial a}, \frac{\partial \lambda}{\partial e}, \frac{\partial \lambda}{\partial i}$$

are partial derivatives of a variation rate of an along-track angle influenced by the perturbative force with respect to the semi-major axis, the eccentricity and the orbit inclination, respectively, and $\Delta \dot{a}$, $\Delta \dot{e}$, $\Delta \dot{i}$ are respective variation rates, which are determined by the perturbative forces applied to the respective satellite.

11. The method for maintaining Walker constellation formation according to claim 1, wherein the step of determining the second offset amount of each satellite within the simulation time period according to the parameters of the Walker constellation after the first offset further comprises:
   determining a second relative drift amount of each satellite at each simulation moment according to the parameters of the Walker constellation after the first offset; and determining the second offset amount of each satellite within the simulation time period according to the respective second relative drift amount.

12. The method for maintaining Walker constellation formation according to claim 11, wherein the step of determining the second offset amount of each satellite within the simulation time period according to the respective second relative drift amount further comprises:
   determining a relational expression of the second relative drift amount varying over time within the simulation time period;
   performing quadratic polynomial fitting on the relational expression to obtain a first-order variation rate and a variation acceleration of relative drift of each satellite within the simulation time period; and
   determining the second offset amount of each satellite according to the first-order variation rate and the variation acceleration.

13. The method for maintaining Walker constellation formation according to claim 12, wherein the step of determining the relational expression of the second relative drift amount varying over time within the simulation time period further comprises:
   the relational expression of the second relative drift amount varying over time within the simulation time period is a sixth formula, which is written as:

$$\begin{cases} \Delta\Omega(t) = \Delta\Omega_0 + \tilde{k}_1^\Omega t + 0.5 \tilde{k}_2^\Omega t^2 + O(t^2) \\ \Delta\lambda(t) = \Delta\lambda_0 + \tilde{k}_1^\lambda t + 0.5 \tilde{k}_2^\lambda t^2 + O(t^2) \end{cases},$$

where $\Delta\Omega(t)$ represents a right ascension of ascending node as a function of time, $\Delta\lambda(t)$ represents an along-track angle as a function of time, $\Delta\Omega_0$ is an initial value of relative drift of the right ascension of ascending node, $\Delta\lambda_0$ is an initial value of relative drift of the along-track angle, $\tilde{k}_1^\Omega$ and $\tilde{k}_2^\Omega$ are a residual term of a first-order variation rate and a residual term of a variation acceleration of the relative drift of the right ascension of ascending node after the first offset, respectively, $\tilde{k}_1^\lambda$ and $\tilde{k}_2^\lambda$ are a residual term of a first-order variation rate and a residual term of a variation acceleration of the relative drift of the along-track angle after the first offset, respectively, and $O(t^2)$ is a higher-order term after the first offset.

14. A terminal device, comprising a non-transitory memory, a processor and a computer program which is stored on the memory and can be run on the processor, wherein the computer program, when executed by the processor, implements a method for maintaining Walker constellation formation, comprising steps of: determining, according to parameters of a Walker constellation, a first offset amount of each satellite within a simulation time period; performing first offset on each satellite according to the first offset amount to obtain a Walker constellation after the first offset; determining, according to parameters of the Walker constellation after the first offset, a second offset amount of each satellite within the simulation time period; and superimposing the first offset amount and the second offset amount, and performing second offset on each satellite according to a superimposing result so as to maintain the formation of the Walker constellation.

\* \* \* \* \*